Ll

US007685203B2

(12) United States Patent
Murthy

(10) Patent No.: US 7,685,203 B2
(45) Date of Patent: Mar. 23, 2010

(54) MECHANISM FOR MULTI-DOMAIN INDEXES ON XML DOCUMENTS

(75) Inventor: Ravi Murthy, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 403 days.

(21) Appl. No.: 11/169,402

(22) Filed: Jun. 28, 2005

(65) Prior Publication Data
US 2006/0212420 A1     Sep. 21, 2006

Related U.S. Application Data

(60) Provisional application No. 60/664,280, filed on Mar. 21, 2005.

(51) Int. Cl.
*G06F 17/30* (2006.01)

(52) U.S. Cl. ........................... 707/769; 707/797

(58) Field of Classification Search ............. 707/3, 707/101
See application file for complete search history.

(56) References Cited

U.S. PATENT DOCUMENTS

| | | | | |
|---|---|---|---|---|
| 5,995,971 A * | 11/1999 | Douceur et al. | ............. | 707/102 |
| 6,330,567 B1 * | 12/2001 | Chao | ............. | 707/200 |
| 6,519,602 B2 * | 2/2003 | Sundaresan et al. | ............. | 707/100 |
| 6,539,396 B1 * | 3/2003 | Bowman-Amuah | ............. | 707/103 R |
| 6,721,727 B2 * | 4/2004 | Chau et al. | ............. | 707/3 |
| 7,181,438 B1 * | 2/2007 | Szabo | ............. | 707/2 |
| 2001/0049671 A1 * | 12/2001 | Joerg | ............. | 706/50 |
| 2002/0059201 A1 * | 5/2002 | Work | ............. | 707/3 |
| 2002/0103789 A1 * | 8/2002 | Turnbull et al. | ............. | 707/3 |
| 2002/0116370 A1 * | 8/2002 | Harvey | ............. | 707/3 |
| 2003/0208478 A1 * | 11/2003 | Harvey | ............. | 707/3 |
| 2003/0217047 A1 * | 11/2003 | Marchisio | ............. | 707/3 |
| 2004/0044659 A1 * | 3/2004 | Judd et al. | ............. | 707/3 |
| 2004/0078364 A1 * | 4/2004 | Ripley et al. | ............. | 707/3 |
| 2004/0148278 A1 * | 7/2004 | Milo et al. | ............. | 707/3 |
| 2004/0220926 A1 * | 11/2004 | Lamkin et al. | ............. | 707/3 |
| 2004/0230572 A1 * | 11/2004 | Omoigui | ............. | 707/3 |
| 2005/0055345 A1 * | 3/2005 | Ripley | ............. | 707/3 |
| 2005/0165866 A1 * | 7/2005 | Bohannon et al. | ............. | 707/203 |
| 2005/0229158 A1 * | 10/2005 | Thusoo et al. | ............. | 717/115 |
| 2006/0100989 A1 * | 5/2006 | Chinchwadkar et al. | ............. | 707/3 |

* cited by examiner

*Primary Examiner*—Don Wong
*Assistant Examiner*—Kim T Nguyen
(74) *Attorney, Agent, or Firm*—Hickman Palermo Truong & Becker LLP; Adam C. Stone

(57) ABSTRACT

An XML document can contain domain-specific information, which typically has its own semantics and operations independent of the XML domain. Specialized indexes and operations are used to manage information within different types of domains, for example, text, spatial, life sciences, time series, image, and multimedia domains. Entries in domain-specific indexes are augmented to include data that indicates the position of domain information within the underlying hierarchy, referred to as order keys. The domain-specific index is used to locate instances of the requested information within the domain and to determine whether any of the instances satisfy the request. Determining whether the request is satisfied includes determining whether any of the instances of the domain information are positioned within the hierarchy at a location that satisfies the path specified in the request, i.e., an instance of the information has an appropriate relationship with the particular node specified in the request.

16 Claims, 2 Drawing Sheets

MECHANISM FOR MULTI-DOMAIN INDEXES ON XML DOCUMENTS

CROSS-REFERENCE TO RELATED APPLICATIONS

This application claims the benefit of priority to U.S. Provisional Patent Application No. 60/664,280 filed on Mar. 21, 2005, entitled "A Mechanism for Multi-Domain Indexes on XML Documents", the content of which is incorporated by this reference in its entirety for all purposes as if fully set forth herein.

FIELD OF THE INVENTION

The present invention relates to managing information and, more specifically, accessing information contained in XML documents.

BACKGROUND

XML (eXtensible Markup Language) is increasingly being used to represent semi-structured data. In recent years, there are many database systems that allow storage and querying of XML data. Large collections of potentially large XML documents are stored in database systems. Such collections are typically queried using languages such as XPath. However, the standard XPath language is being extended to introduce functions and operators from several other domains, where a domain of information can be defined as semantic-based information that is associated with its own specialized operations and which can be contained in an XML document.

Various domain-specific indexing schemes can be and have been developed to support a set of domain operators and functions. Such schemes can be registered with a database management system and implemented as a set of interface functions.

For an example of a domain function, a contains( ) function within XPath can be used to perform full-text search. The semantics of the contains( ) function embedded within XPath is fundamentally tied to the notion of XML nodes. One variant of the contains( ) function invoked on a complex XML element is evaluated to true if the "virtual" text document formed by concatenating all the text descendants of the specified element contains the specified keyword. There are other variants of this function, which also crucially depend on the understanding of XML nodes and hierarchical relationship between nodes.

To improve performance of standard XPath queries, various indexing strategies have been developed. For example, a Path Table may be populated with certain information about each node in an XML document, and XPath queries rewritten into standard SQL queries against the Path Table. However, these indexing mechanisms only accelerate queries involving XPath with forward axes (child, descendant) and value comparisons. Such mechanisms are not as effective with queries involving functions from other domains, such as text, spatial, life sciences, time series, image, and multimedia domains. Though XML specific indexes can be used to improve the XPath portion of the queries, the domain-specific portions have to be deferred to a slow post-processing step Even if a separate text index is created on XML documents, there is no mechanism to combine the results, at a node level, from the XPath-based index and the text index. An XPath query can be used to identify a particular node, but XPath has no mechanism to avail of the semantic context within a domain. Further, a domain-based index may facilitate locating and operating upon information within domains contained in an XML document, but there is no mechanism to relate this information to the underlying XML hierarchy in which the domain is contained. Hence, due to relative coarse granularity of results (i.e., results at the XML document level), the value of XML is diminished. For example, a text index may return several instances of a requested keyword from within an XML document, however, there is no way of knowing in which particular text nodes the keyword instances were found. In other words, there is no way of determining whether any hits from the XPath-based index (hits at the node level) match any hits from the text index (hits at the XML document level).

In contrast, one approach is to treat every node as a document, from the viewpoint of a domain-based index. However, with such an approach, if multiple elements are requested from within a domain, the domain index would not return a hit unless all the requested elements are within the same node. This is undesirable in an XML context. That is, if one node contains one of the elements and a sibling node contains another of the elements, then it is desirable that a hit is returned for the parent node of those two nodes because the parent node "contains" both elements.

With all prior approaches to XPath queries that include domain-based operators, only the following can occur: (1) you get hits for XPath satisfied OR domain-based operator satisfied, but not hits indicating that both are satisfied; or (2) you get hits at the document level, indicating that a particular XML document satisfies the XPath AND satisfies the domain-based operator. Significantly, neither of these results indicates that a particular node(s) satisfies the XPath and the domain-based operator.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
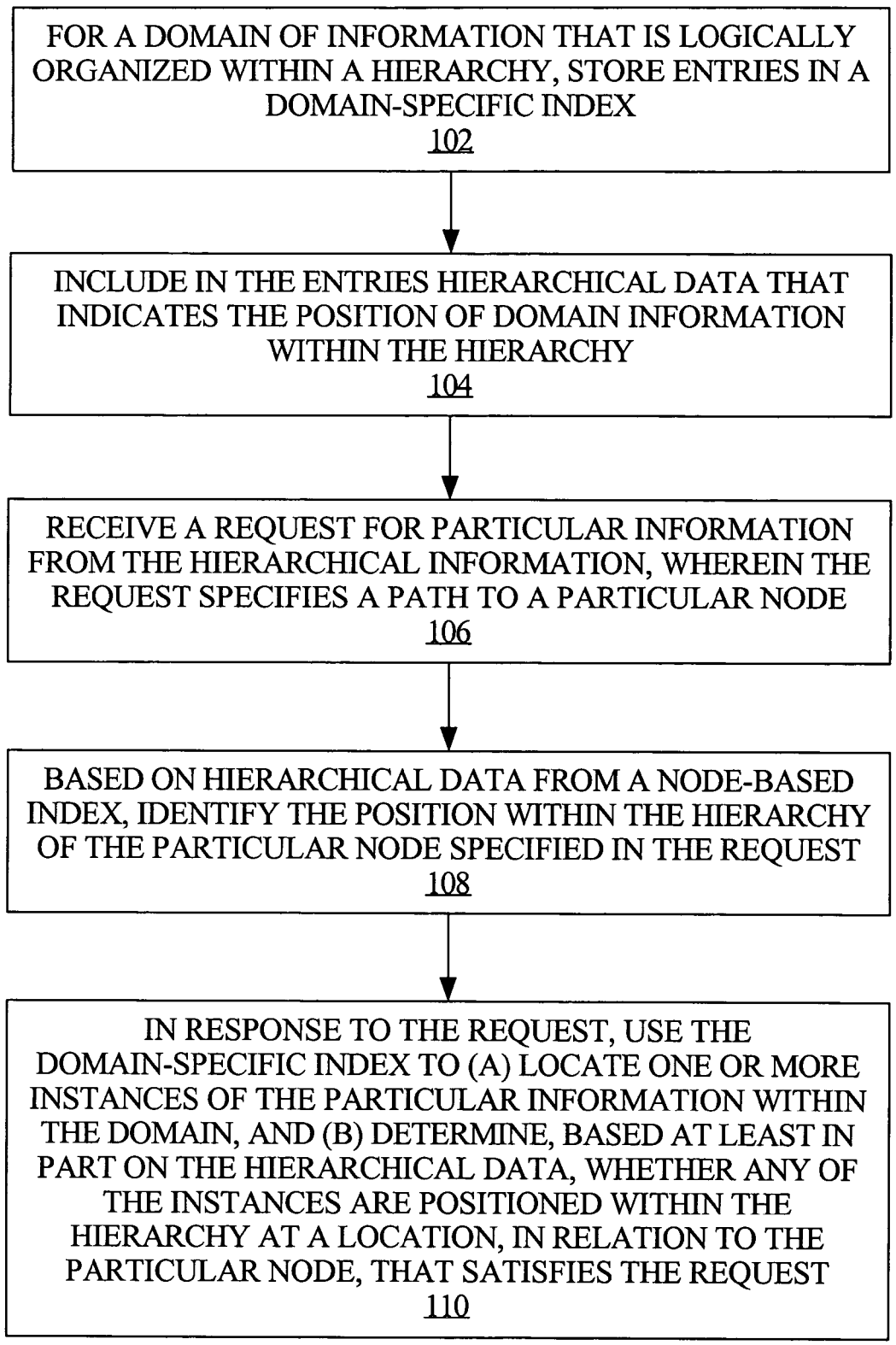
FIG. 1 is a flow diagram that illustrates a technique for accessing information that is logically organized as a hierarchy, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Throughout this description, numerous references are made to XML documents and associated hierarchies of nodes, to provide specific examples of a possible implementation of the broader techniques described herein. However, these techniques are not limited strictly to implementation with XML documents. Rather, these techniques may be implemented in the context of any hierarchical information that is logically organized as a hierarchy.

Functional Overview of Embodiments

Techniques are described herein for accessing information that is logically organized as a hierarchy, such as XML documents. An XML document can contain domain-specific information, which typically has its own semantics and operations independent of the XML domain. Specialized indexes and operations are available to manage information within different types of domains, for example, text, spatial, life sciences, time series, image, and multimedia domains, etc.

Domain-specific indexes are augmented with a notion of the underlying hierarchy in which corresponding domains are contained. Entries in domain-specific indexes are augmented to include data that indicates the position of information in the domain within the hierarchy. For example, a text index (e.g., an inverted list, such as in a book) that is constructed for a text domain contained in an XML document is augmented to include an order key. From the standpoint of XML documents, the order key is part of an order index that associates hierarchical ordering information with indexed nodes in the XML hierarchy. The order index is used to determine parent-child, ancestor-descendant, and sibling relationships between XML nodes.

In one embodiment, processing a query that requests domain information from an XML document that contains one or more domains includes using a domain-specific index. The domain-specific index contains entries that include order keys that indicate the position of information, within the hierarchy, that is in the domain. The request specifies a path to a particular node. The domain-specific index is used to locate instances of the domain information within the domain and to determine whether any of the instances satisfy the request. Determining whether the request is satisfied includes determining whether any of the instances of the domain information are positioned within the hierarchy at a location that satisfies the path specified in the request, i.e., an instance of the information has an appropriate relationship with the particular node specified in the request.

In one embodiment, processing the query includes using an XML index, whose entries include order keys for each node in the XML hierarchy, to identify the hierarchical position of the particular node specified in the request. The results from the XML index and the domain-specific index are then merged using appropriate order key conditions, in order to satisfy the query.

Augmentation of domain-specific indexes can be implemented for different domain types within an XML document, and serves to make the domains "node aware." Injecting knowledge of the structure of the "containing" hierarchy into the "contained" domain, along with how to process that knowledge, enables optimal query performance (e.g., XPath queries) by combining the XML index mechanism with one or more other domain-specific indexes. Based on the costs and selectivities associated with use of various data access structures, a database query optimizer can now select the optimal choice of indexes and the order in which the various components of the query are evaluated.

XML Index

The content of U.S. patent application Ser. No. 10/884,311, entitled "Index for Accessing XML Data", is incorporated by this reference in its entirety for all purposes as if fully disclosed herein. U.S. patent application Ser. No. 10/884,311 describes a mechanism for indexing paths, values and order information in XML documents. The mechanism involves using a set of structures, which collectively constitute an index, for accessing XML data. According to one embodiment, the index (referred to herein as an "XML index") includes three logical structures: a path index, an order index and a value index. In one embodiment, all three logical structures reside in a single table, referred to herein as the PATH_TABLE.

The XML index can be used to satisfy XPath queries by decomposing them into simple paths and predicates on values. The resulting decomposed pieces are translated into SQL queries on the index PATH_TABLE. Use of the XML index to satisfy XPath queries is described in greater detail in the Ser. No. 10/884,311 reference.

One of the most commonly used parts of the XPath query language includes navigational (parent-child-descendent) access. As is described in detail in the Ser. No. 10/884,311 reference, by virtue of tracking paths and order information, the XML index can be used to satisfy navigational access methods effectively. The XML index is an index that improves the performance of queries that include XPath-based predicates and/or XPath-based fragment extraction. An XML index can be built, for example, over both XML schema-based as well as schema-less XMLType columns that are stored either as CLOB or structured storage.

The path index provides the mechanism to lookup fragments based on simple (navigational) path expressions. The order index associates hierarchical ordering information with indexed nodes. The order index is used to determine parent-child, ancestor-descendant and sibling relationships between XML nodes (i.e., elements and attributes). When a user submits a query involving XPaths (as predicate or fragment identifier), the user XPath is decomposed into a SQL query that accesses the XML index table. The generated query is typically executed to perform a set of path, value and order-constrained lookups and merge their results appropriately.

Path Table

According to the Ser. No. 10/884,311 reference, a logical XML index includes a Path table and a set of secondary indexes. Each indexed XML document may include many indexed nodes. The Path table contains one row per indexed node. For each indexed node, the Path table row for the node contains various pieces of information associated with the node.

The information contained in the Path table may include (1) a PATHID that indicates the path to the node, (2) "location data" for locating the fragment data for the node within the base structures, and (3) "hierarchy data" that indicates the position of the node within the structural hierarchy of the XML document that contains the node. Optionally, the Path table may also contain value information for those nodes that are associated with values. Each of the foregoing pieces of information is described in greater detail in the Ser. No. 10/884,311 reference. Of particular interest for the present techniques described herein is the hierarchy data, otherwise referred to herein as an "order key."

Order Key

The order key may be represented using a Dewey-type value. Specifically, the order key of a node is created by appending a value to the order key of the node's immediate parent, where the appended value indicates the position, among the children of the parent node, of that particular child node.

For example, assume that a particular node D is the child of a node C, which itself is a child of a node B that is a child of a node A. Assume further that node D has the order key 1.2.4.3. The final "3" in the order key indicates that the node D is the third child of its parent node C. Similarly, the "4" indicates that node C is the fourth child of node B. The "2" indicates that Node B is the second child of node A. The leading "1" indicates that node A is the root node (i.e. has no parent).

As mentioned above, the order key of a child may be easily created by appending to the order key of the parent a value that corresponds to the number of the child. Similarly, the order key of the parent is easily derived from the order key of the child by removing the last number in the order key of the child. The composite numbers represented by each order key can be converted into byte-comparable values, so that a mathematical comparison between two order keys indicates the relative position, within the structural hierarchy of an XML document, of the nodes to which the order keys correspond.

For example, the node associated with the order key 1.2.7.7 precedes the node associated with the order key 1.3.1 in the hierarchical structure of an XML document. Thus, the database server uses a conversion mechanism that converts order key 1.2.7.7 to a first value, and to convert order key 1.3.1 to a second value, where the first value is less than the second value. By comparing the second value to the first value, the database server can easily determine that the node associated with the first value precedes the node associated with the second value. Various conversion techniques may be used to achieve this result, and the invention is not limited to any particular conversion technique.

Domain-Specific Indexes

As mentioned, various domain-specific indexing schemes can be and have been developed to support a set of domain operators and functions and registered with a database management system. These domain-specific indexes can be created on the Path table. For example, a Text index can be created to handle the node-level contains( ) function.

In one embodiment, the inverted list table underlying the Text index stores the order key of the indexed node. In other words, the index is built at the level of XML nodes rather than at the level of XML documents.

Consider the following simplified XML document.

<Employee id=123>
  <Name>
    <FirstName>Scott</FirstName>
    <LastName>Tiger</LastName>
  </Name>
  <MaidenName>Scott<MaidenName>
</Employee>

The XML index entries for the above document are as follows:

| PATHID | RID | ORDER_KEY | VALUE |
|---|---|---|---|
| 100 | 1 | 1 | |
| 101 | 1 | 1.1 | 123 |
| 102 | 1 | 1.2 | |
| 103 | 1 | 1.2.1 | Scott |
| 104 | 1 | 1.2.2 | Tiger |
| 105 | 1 | 1.3 | Scott |

Further, the Text index stores order keys with tag occurrences as shown below.

| TEXT_TOKEN | OCCURRENCE_LIST (docid, order-key,) |
|---|---|
| Scott | 1, 1.2.1, 1.3 |
| Tiger | 1, 1.2.2 |

Storing the order key in the inverted list enables highly efficient evaluation of XPaths with, for example, an embedded contains( ) function. The Path table is used for accelerating the path and value components of the query. The inverted list table (i.e., the Text index) is used for accelerating the contains( ) component of the query. Further, the result sets from these two tables are combined using appropriate order key conditions based on the particular query.

The appropriate order key conditions may include conditions involving any of the following relationships between the XML index results and the domain-specific index results, depending on the particular XPath being evaluated: (a) same node; (b) parent-child nodal relationship; (c) ancestor-descendent nodal relationship; and (d) sibling relationship.

Single Element Domain Query

Consider the following XPath Query:

/Employee[@id>100]/Name[ora:contains(., Scott)].      Query 1

Assuming a B-Tree NUMBER value index on path table, the XML index returns matches for the first part of the query, which is "/Employee[@id>100]/Name." The matches returned by the XML index are:

| Rowid | Order key |
|---|---|
| 1 | 1.2 | where the XML index returns the order key that corresponds to the hierarchical node that is associated with the tag <Name>. The tag <Name> is within a text domain, on which a Text index is constructed as above. Thus, the XML index is used to query as far as the domain node, where the Text index can be used to query within the domain (i.e., within the tag <Name>), using the domain-specific contains( ) operator.

Assume the Text index evaluates the latter portion of the query, i.e., contains (Scott). Hence, the matches returned by the Text index that is augmented with order keys, according to an embodiment of the invention, are:

| Rowid | Order key |
|---|---|
| 1 | 1.2.1 |
| 1 | 1.3 |

A final merge of the XML index and domain index result streams is performed, for this particular example, based on the following conditions:

(1) Rowid values are the same.
(2) The order key in the first stream is a parent of the order key in the second stream.

Hence, because order key 1.2.1 (returned from Text index) is the child of order key 1.2 (returned from XML index), the query is satisfied based on the fact that the path to the <Name> node satisfies the query and the fact that the attribute "Scott" is within (a child of) the correct node.

In contrast, merging the XML index result with the Text index result entry with an order key 1.3 would produce no results because 1.2 is not the parent of 1.3 and, therefore, the second attribute "Scott" would not be within the correct node as specified in the XPath query. That is, the attribute is not contained within the tag <Name> but within the tag <MaidenName>.

Consider the following XPath Query:

/Employee[@id>100]/MaidenName[ora:contains(., Scott)]. Query 2

The XML index returns matches for the first part of the query, which is "/Employee[@id>100]/MaidenName." The matches returned by the XML index are:

| Rowid | Order key |
|-------|-----------|
| 1     | 1.3       | where the XML index returns the order key that corresponds to the hierarchical node that is associated with the tag <MaidenName>. Hence, because order key 1.3 (returned from Text index) is the same node as the node of order key 1.3 (returned from XML index), the query is satisfied based on the fact that the path to the <MaidenName> node satisfies the query and the fact that the attribute "Scott" is within (the same as) the correct node.

Multiple Element Domain Query

Consider the following XPath Query:

/Employee[@id>100]/Name[ora:contains(., Scott AND Tiger)] Query 3

In scenarios that involve text searches involving multiple keywords and/or phrases, the Text index returns the most restrictive matching node (i.e., the minimum common ancestor). In other words, the Text index returns the node whose text value satisfies the predicate and has no descendant node whose text value also satisfies the predicate. With the above query, the Text index combines the order-keys for "Scott" and for "Tiger" and returns the most restrictive matching node, which by combining 1.2.1 and 1.2.2, is 1.2. The Text index results are combined with those returned by the XML index as appropriate based on the XPath query.

Generally, the Text index can join (using AND or OR semantics) the order keys returned by individual inverted lists in order to return a set of matching order keys.

The text domain is simply one example of a domain of information that can be embedded within an XML document, or within some other data container of logically hierarchically structured information. Similarly, the contains( ) function is simply one example of a domain-specific function that can be embedded within an XPath and efficiently evaluated by a XML node-aware domain index as described herein. In general, embodiments of the invention described herein are applicable to any domain specific functions that are used in combination with XPaths, or other path-based mechanisms. Since the domain specific indexes return node-level results in terms of document identifier and order keys, multiple result sets can be combined using appropriate order key hierarchical conditions.

Using a Domain-Specific Index to Answer a Query

FIG. 1 is a flow diagram that illustrates a technique for accessing information that is logically organized as a hierarchy, according to an embodiment of the invention. The technique illustrated in FIG. 1 may be performed by executing one or more sequences of instructions by one or more processors, such as within a computer system (e.g., computer system 200 of FIG. 2).

At block 102, for a domain of information that is logically organized within a hierarchy, store entries in domain-specific index. At block 104, hierarchical data that indicates the position of indexed information within the hierarchy is included in the entries in the domain-specific index include. For example, when constructing a text index to index text contained within an XML document, order keys are included in the index entries. Typically, the text index entries will also include a document identifier (e.g., docid) to identify the particular XML document that contains the corresponding text. As mentioned, domain-specific indexing schemes can be developed for any type of domain of information. Therefore, hierarchical data that indicates the position of indexed information within a hierarchy (e.g., order keys) can be included in entries for any type of domain, in order to make the domain-specific index aware of the hierarchy within which corresponding domain information is contained. Blocks 102 and 104 can be implemented as a single step or action and are not in any way limited to performance as separate actions.

At block 106, a request is received for particular information from the hierarchical information. The request specifies a path to a particular node in the hierarchy. Non-limiting examples of such requests are previously described herein. One such type of request is a database query that uses the XPath query language, submitted to a database server for execution against a table that contains the contents of multiple, perhaps many, XML documents.

In one embodiment, at optional block 108, the position within the hierarchy of the particular node for which a path is specified in the request is identified based on another node-based index. For example, an XML index as described above and in U.S. patent application Ser. No. 10/884,311 may be used to execute the path portion of the query in order to identify the order key of the particular node. Use of the XML index in this manner is described above and in greater detail in the Ser. No. 10/884,311 reference.

In response to the request, at block 110, the domain-specific index is used (a) to locate one or more instances of the particular information within the domain of information; and (b) to determine whether any of the instances of the particular information satisfy the request. Locating one or more instances of the particular information can be performed according to conventional use of a relevant domain-based index. For example, if the request includes the text function contains( ), then a Text index (e.g., an inverted list) can be conventionally used to locate all the occurrences of the requested text in the table that contains the XML documents.

Significantly, determining whether any of the instances of the particular information satisfy the request includes determining such, based at least in part on the hierarchical data in the domain-specific index. Further, the determination includes determining whether any of the instances are positioned within the hierarchy at a location, in relation to the particular node for which a path is specified in the request, that satisfies the request.

A particular relation that satisfies the request is query-specific. For example, with Query 1, an instance of "Scott" that satisfies the request is contained in a child node (node containing tag <FirstName>) of the particular node for which a path is specified in the request (node containing tag <Name>). For example, with Query 2, an instance of "Scott" that satisfies the request is contained in the same node (node containing tag <MaidenName>) of the particular node for which a path is specified in the request (node containing tag <MaidenName>). For example, with Query 3, instances of "Tiger" and "Scott" that satisfy the request are contained in descendent nodes (nodes containing tag <FirstName> and tag <LastName>, respectively) of the particular node for which a path is specified in the request (node containing tag <Name>). Another possible relationship between the node for which a path is specified in the query and the one or more nodes that contain the requested domain information (other than parent-child, same, and ancestor-descendent, each of which is exemplified above) is a sibling relationship.

Embodiments of the invention are applicable to any database system or other repositories of XML documents, or other data logically structured as a hierarchy. A large class of queries which combine XPath constructs with other domain-specific functions are impacted by the techniques described herein.

Variations of Queries

One slight variation of the technique described in FIG. 1 involves processing a multi-element request, i.e., a request for first information and second information, such as in Query 3. Block 110 is modified so that locating the particular information within the domain includes locating one or more instances of the first information (e.g., "Scott") and one or more instances of the second information (e.g., "Tiger"). Note that an instance of the first information may be contained in one node while an instance of the second information may be contained in a different node, where both nodes are within the same domain (e.g., the text domain).

With this variation, block 110 is further modified so that determining whether the instances satisfy the request includes determining, based on the hierarchical data in the domain-specific index, whether both nodes are positioned within the hierarchy at locations (in relation to the particular node for which a path is specified in the hierarchy) that satisfy the request. In one embodiment, this determination includes determining the closest common ancestor node of the two nodes, as described above in reference to Query 2. Note that processing a multi-element query is not limited to processing a two element query. Rather, any number of searchable elements (e.g., keywords, in the context of the text domain) may be specified in the query and a similar, extended processing technique is applicable. In this variation, the nodal relationship that is analyzed to determine whether the instances of the particular information satisfy the request is an appropriate query-based relationship between (a) the particular node for which a path is specified in the request and (b) the closest common ancestor node for the particular information instance nodes. For example, determining whether the closest common ancestor node is the same as, a child or other descendent of, or a sibling of, the particular node.

Another variation of the technique described in FIG. 1 involves processing a request for information from multiple different domains, i.e., a request for first information from a first domain and second information from a second domain that is a different domain than the first domain. For example, an employee table that contains information about employees may be based on an XML document for each employee. The XML document may include the following for each employee:

(a) a resume, a list of professional references, referral letters from professional references, and published articles, etc., all of which are considered within the "text" domain and organized according to a hierarchy associated with a tag <resume> that is not the primary XML hierarchy, e.g., a sub-tree for the <resume> tag;

(b) a digital picture, represented in accordance with semantics of the "image" domain; and (c) a home address, represented in accordance with semantics of the "spatial" domain. Thus, a requestor may query the employee table for all employees that have "Unix" and "Oracle" in their resume (as opposed to other elements under the <resume> tag), have a home address within 10 miles of the company location, and have a digital picture of a certain size. Such a query could be efficiently processed using the techniques described herein by farming out the work to the various respective domain indexes, which are augmented to include the hierarchical order keys.

For this variation, block 110 is modified so that locating the particular information includes locating one or more instances of the first information (e.g., "Unix" and "Oracle"), one or more instances of the second information (e.g., home address within 10 miles of the company), and one or more instances of the third information (e.g., picture of certain size). Respective domain-specific indexing mechanisms are used to locate the requested information from within the respective domains. Each of these instances may be contained in one node or in separate nodes because each domain is effectively superimposed over the primary underlying XML, or other, hierarchical domain.

With this variation, block 110 is further modified so that determining whether the instances satisfy the request includes determining, based on the hierarchical data in the domain-specific indexes, whether nodes containing the instances of information are positioned within the hierarchy at locations (in relation to the particular node for which a path is specified in the hierarchy) that satisfy the request. In this variation, the nodal relationship that is analyzed to determine whether the instances of the particular information satisfy the request is an appropriate query-based relationship between (a) the particular node for which a path is specified in the request and (c) the closest common ancestor nodes for each of the combinations of the particular information instance nodes for all of the domains. For example, determining whether any closest common ancestor nodes are the same as, a child or other descendent of, or a sibling of, the particular node.

Implementation Mechanisms

Path-Based Query Rewrite

A path-based query (e.g., an XPath-based query) that is submitted to a database server can be rewritten into a query against various indexing mechanisms, such as an XML node-based XML index and a domain-specific index. The manner in which the path-based queries are rewritten may vary from implementation to implementation, and is not limited to any particular conversion mechanism.

Non-limiting examples of how a query may be rewritten to benefit from the techniques described herein is as follows. These examples are in the context of rewriting an XPath database query into a standard SQL query.

Original Query 4:
select 1
from xmltab
where existsNode (doc,/a/b[ora:contains(c, cat and dog)])=1;

Rewritten Query 4:

```
select 1
from xmltab
where exists
    (select 1
        from path_tab p1, path_tab p2
        where p1.pathid = :1           [corresponds to /a/b]
        and p2.pathid = :2             [corresponds to /a/b/c]
        and p1.rid = p2.rid            [JOIN of p1 and p2]
        and p1.orderkey = sys_orderkey_parent(p2.orderkey)
        and contains(p2.value, cat and dog) >0
    ).
```

Original Query 5:
    select 1 from xmltab
    where existsNode(doc,/a[@id>100]/b[ora:contains(., cat and dog)])=1;

Rewritten Query 5:

```
select 1 from xmltab
where exists (
    select 1
    from path_tab p1, path_tab p2, path_tab p3
    where p1.pathid = :1              [corresponds to /a]
    and p2.pathid = :2                [corresponds to /a/@id]
    and p1.rid = p2.rid               [JOIN p1 and p2]
    and p1.orderkey = sys_orderkey_parent(p2.orderkey)
    and p2.value > 100
    and p3.pathid = :3                [corresponds to /a/b]
    and p1.rid = p3.rid               [JOIN p1 and p3]
    and p1.orderkey = sys_orderkey_parent(p3.orderkey)
    and contains(p3.value, âEUR~cat AND dogâEUR (TM)) > 0
).
```

Hardware Overview

Figure 2:
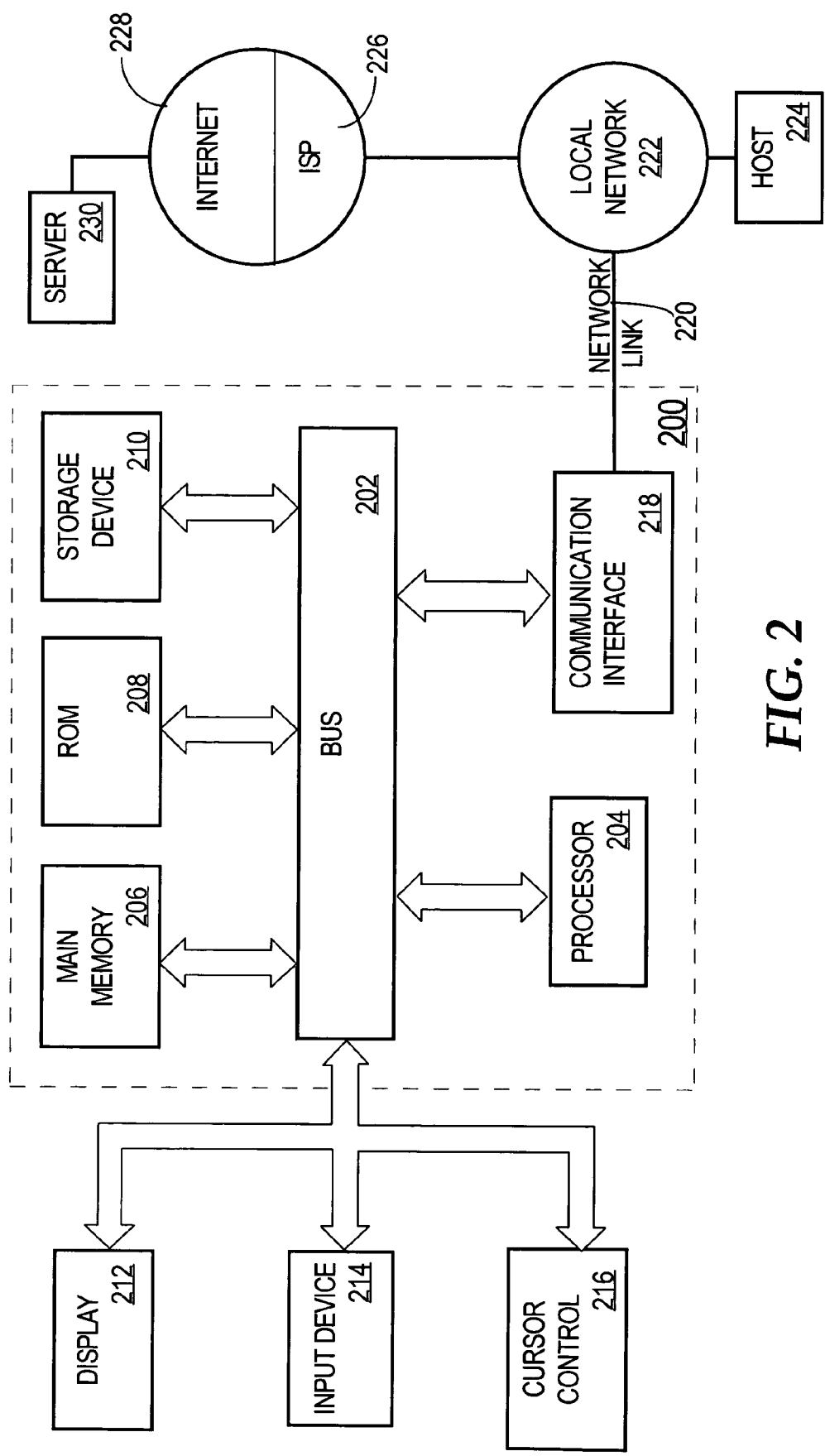
FIG. 2 is a block diagram that illustrates a computer system 200 upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for accessing XML data, the method comprising:
   storing a plurality of entries in an index, wherein each entry of the plurality of entries includes (a) a value from said XML data and (b) one or more hierarchical position indicators;
   wherein at least one entry of the plurality of entries includes a plurality of hierarchical position indicators;
   wherein each hierarchical position indicator in each entry of the plurality of entries specifies a hierarchical position of an element in the XML data that contains an instance of the value included in the entry;
   receiving a query for information from the XML data, wherein the query comprises path criterion and value criterion;
   in response to receiving the query,
      locating an entry of the plurality of entries in said index;
      wherein said located entry includes a value from said XML data that satisfies said value criterion; and
      determining whether an instance of the value included in the located entry satisfies the query by determining whether a hierarchical position indicator included in the located entry satisfies said path criterion;
   wherein the method is performed by one or more computing devices.

2. The method of claim 1,
   wherein a second index includes at least one entry for a particular element in the XML data;
   wherein the at least one entry in the second index includes hierarchical data that indicates a hierarchical position of the particular element in the XML data; and
   wherein determining whether a hierarchical position indicator of the located entry satisfies said path criterion is based on said hierarchical data included in the at least one entry of the second index.

3. The method of claim 1, wherein the XML data is an XML document.

4. The method of claim 1, wherein the query is formulated using an XML query language.

5. The method of claim 1, wherein each hierarchical position indicator in each entry of the plurality of entries comprises an order key specifying a hierarchical position of an element in the XML data that contains an instance of the value included in the entry.

6. The method of claim 1, wherein at least one entry of the plurality of entries comprises a document identifier that identifies an XML document that contains at least one instance of the value included in the at least one entry.

7. The method of claim 1, wherein the path criterion specifies a path to a particular element in the XML data.

8. The method of claim 1, wherein said query comprises path criterion and a plurality of value criteria; and wherein the method further comprises:
   in response to receiving the query,
      locating a plurality of entries in said index;
      wherein each located entry of the plurality of located entries includes a value from said XML data that satisfies at least one value criterion of said plurality of value criteria; and
      determining whether an instance of the value included in a located entry of the plurality of located entries satisfies the query by determining whether a hierarchical position indicator included in the located entry satisfies said path criterion.

9. A computer-readable storage medium storing instructions for:
   storing a plurality of entries in an index, wherein each entry of the plurality of entries includes (a) a value from said XML data and (b) one or more hierarchical position indicators;
   wherein at least one entry of the plurality of entries includes a plurality of hierarchical position indicators;
   wherein each hierarchical position indicator in each entry of the plurality of entries specifies a hierarchical position of an element in the XML data that contains an instance of the value included in the entry;
   receiving a query for information from the XML data, wherein the query comprises path criterion and value criterion;
   in response to receiving the query,
      locating an entry of the plurality of entries in said index;
      wherein said located entry includes a value from said XML data that satisfies said value criterion; and
      determining whether an instance of the value included in the located entry satisfies the query by determining whether a hierarchical position indicator included in the located entry satisfies said path criterion.

10. The computer-readable storage medium of claim 9,
    wherein a second index includes at least one entry for a particular element in the XML data;

wherein the at least one entry in the second index includes hierarchical data that indicates a hierarchical position of the particular element in the XML data; and wherein determining whether a hierarchical position indicator of the located entry satisfies said path criterion is based on said hierarchical data included in the at least one entry of the second index.

11. The computer-readable storage medium of claim 9, wherein the XML data is an XML document.

12. The computer-readable storage medium of claim 9, wherein the query is formulated using an XML query language.

13. The computer-readable storage medium of claim 9, wherein each hierarchical position indicator in each entry of the plurality of entries comprises an order key specifying a hierarchical position of an element in the XML data that contains an instance of the value included in the entry.

14. The computer-readable storage medium of claim 9, wherein at least one entry of the plurality of entries comprises a document identifier that identifies an XML document that contains at least one instance of the value included in the at least one entry.

15. The computer-readable storage medium of claim 9, wherein the path criterion specifies a path to a particular element in the XML data.

16. The computer-readable storage medium of claim 9, wherein said query comprises path criterion and a plurality of value criteria; and wherein the instructions further comprise instructions for:

in response to receiving the query, locating a plurality of entries in said index;

wherein each located entry of the plurality of located entries includes a value from said XML data that satisfies at least one value criterion of said plurality of value criteria; and determining whether an instance of the value included in a located entry of the plurality of located entries satisfies the query by determining whether a hierarchical position indicator included in the located entry satisfies said path criterion.

* * * * *